H. E. EBERHARDT.
MILLING CUTTER.
APPLICATION FILED NOV. 1, 1913.
1,141,700.
Patented June 1, 1915.
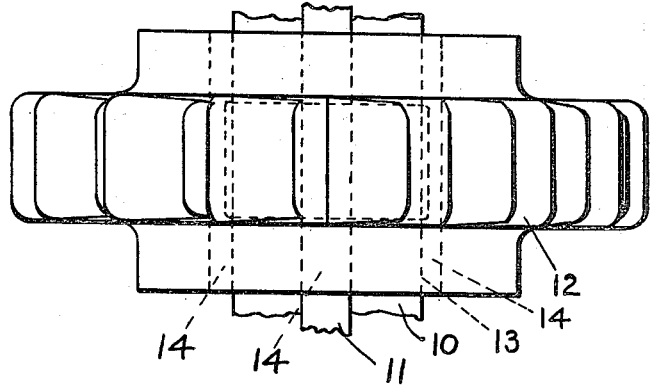
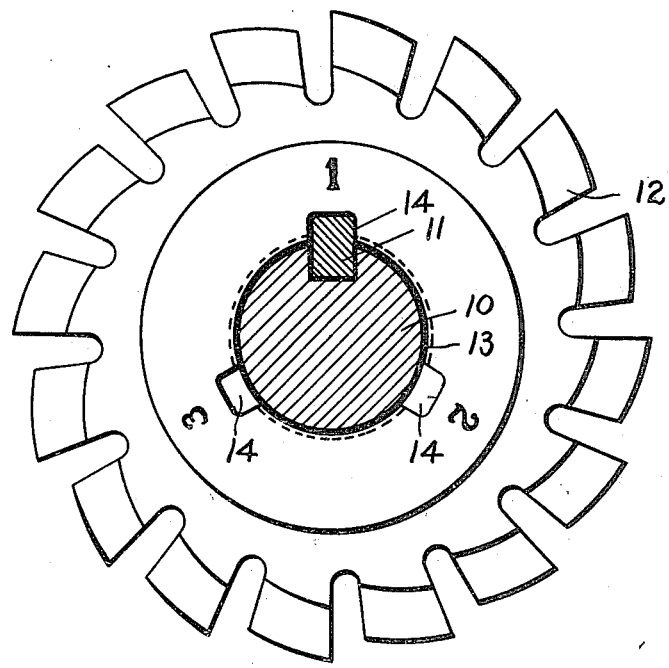
WITNESSES:
Henry J. Eberhardt.
Albert A. Forster.
INVENTOR
Henry E. Eberhardt.
BY
Fred F. Schuetz.
ATTORNEY

UNITED STATES PATENT OFFICE.

HENRY E. EBERHARDT, OF NEWARK, NEW JERSEY, ASSIGNOR TO NEWARK GEAR CUTTING MACHINE CO., OF NEWARK, NEW JERSEY, A CORPORATION OF NEW JERSEY.

MILLING-CUTTER.

1,141,700.     Specification of Letters Patent.     Patented June 1, 1915.

Application filed November 1, 1913. Serial No. 798,635.

*To all whom it may concern:*

Be it known that I, HENRY E. EBERHARDT, a citizen of the United States, and a resident of Newark, in the county of Essex and State of New Jersey, have invented certain new and useful Improvements in Milling-Cutters, of which the following is a specification.

The invention relates to cutters, more particularly to rotary milling cutters or hobs, and which are adapted to be fixedly secured to a rotatable arbor and driven thereby. In cutters of this type, as heretofore constructed and mounted by key and keyway, it is found that the teeth of the same which are nearest to the keyway do most of the cutting. This is due to the fact that the central hole of the cutter is slightly larger, perhaps one one-thousandth of an inch, than the diameter of the arbor over which the cutter is fitted; and when the nut of the cutter arbor is screwed up to fasten the cutter, the tendency of the latter is to crowd itself away from the key and thus to cause the teeth of the cutter on that side to be some two one-thousandths of an inch out of concentricity. Moreover, when the cutter is in action it is crowded away still farther from the said key and approximately but one-third of the teeth do the greater part of the work. These naturally become dull sooner than the rest and sharpening of the cutter is required before all of the teeth are equally worn.

It is the object of the present invention to so construct the cutter that it may be mounted in manner to afford greater cutter efficiency between sharpenings, that is to say, to enable the cutter to be in use for a longer period before requiring resharpening, it being possible with the improved cutter to obtain substantially two-thirds more work out of the cutter than heretofore.

The nature of the invention will be best understood when described in connection with the accompanying drawings, in which—

Figure 1 is a plan of the cutter and a portion of arbor upon which it is mounted. Fig. 2 is an elevation thereof, the arbor and key being shown in section.

Similar characters of reference designate corresponding parts throughout the several views.

Referring to the drawings, 10 designates an arbor rotated in any suitable manner and provided with a key 11 by means of which a cutter 12 may be driven, said cutter being provided with a central opening 13 through which the arbor is fitted and the key 11 being adapted to engage a keyway 14, as is well understood. Instead of providing but one keyway, as is the usual practice, a plurality of keyways 14 are provided and are arranged symmetrically to extend outwardly from the central opening 13. In the present instance, I have shown three such keyways arranged substantially 120° apart; and, furthermore, suitable characters such as the numbers 1, 2, 3, shown, are provided upon the face of the cutter hub to differentiate the respective keyways, the numbers preferably being arranged consecutively in the direction of cutting. Thus when one-third of the teeth have become dulled with the cutter mounted upon the arbor in the position 1, the cutter is removed from the arbor and advanced relatively thereto 120° into position 2 and the keyway 14 corresponding to this position fitted to the key 11. A set of comparatively sharp teeth will then again be brought into action; and when these in turn are dull, the cutter is shifted to the third position and thereafter the cutter as a whole will require resharpening. Had the cutter but one keyway, as in the usual practice, as soon as the set of high teeth were dull, the entire cutter including the sharp as well as the dull teeth would require regrinding, resulting in loss of time as well as of cutter material.

I claim:—

1. The combination with a rotary arbor and a single key thereon, of a milling cutter having a circular hole in the center thereof and provided with a plurality of keyways for said key whereby the cutter may be driven by said arbor.

2. The combination with a rotary arbor and a key thereon, of a milling cutter provided with a circular central hole for the said arbor and with three keyways extending outwardly therefrom and substantially 120° apart whereby the cutter may be driven by said arbor, the said cutter being provided at the respective keyways with suitable characters to differentiate the said keyways.

Signed at Newark, in the county of Essex, and State of New Jersey, this 31st day of October, A. D. 1913.

HENRY E. EBERHARDT.

Witnesses:
HENRY J. EBERHARDT,
FREDK. F. SCHUETZ.

Copies of this patent may be obtained for five cents each, by addressing the "Commissioner of Patents, Washington, D. C."